(12) United States Patent
Park et al.

(10) Patent No.: US 7,996,826 B2
(45) Date of Patent: Aug. 9, 2011

(54) METHOD OF EXECUTING VIRTUAL MACHINE APPLICATION PROGRAM AND DIGITAL BROADCAST RECEIVER USING THE SAME

(75) Inventors: Chong-mok Park, Seoul (KR);
Seung-bum Chung, Seongnam-si (KR);
Duke-man Hur, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1183 days.

(21) Appl. No.: 11/227,141

(22) Filed: Sep. 16, 2005

(65) Prior Publication Data
US 2006/0090157 A1  Apr. 27, 2006

(30) Foreign Application Priority Data
Sep. 25, 2004  (KR) ........................ 10-2004-0077577

(51) Int. Cl.
*G06F 9/45* (2006.01)
*G06F 9/445* (2006.01)
*H04N 7/16* (2011.01)

(52) U.S. Cl. ............ 717/148; 717/173; 717/178; 718/1; 725/136; 725/139

(58) Field of Classification Search ........................ None
See application file for complete search history.

(56) References Cited

U.S. PATENT DOCUMENTS

| 6,110,226 | A | 8/2000 | Bothner | |
|---|---|---|---|---|
| 7,089,554 | B2* | 8/2006 | Shiomi et al. ..................... | 718/1 |
| 7,213,240 | B2* | 5/2007 | Wong et al ..................... | 717/148 |
| 2002/0080174 | A1* | 6/2002 | Kodosky et al. .............. | 345/762 |
| 2003/0079208 | A1* | 4/2003 | Willis ........................... | 717/148 |
| 2005/0229232 | A1* | 10/2005 | Champel et al. .............. | 725/132 |
| 2007/0226714 | A1* | 9/2007 | Doi .............................. | 717/148 |

FOREIGN PATENT DOCUMENTS

| JP | 2001-84146 A | 3/2001 |
|---|---|---|
| KR | 2000-0069240 A | 11/2000 |
| KR | 2001-0080210 A | 8/2001 |
| KR | 10-2004-0053179 A | 6/2004 |
| WO | WO 2004003740 A2 * | 1/2004 |

* cited by examiner

Primary Examiner — Michael J Yigdall
(74) Attorney, Agent, or Firm — Sughrue Mion, PLLC

(57) ABSTRACT

A method is provided for receiving a digital broadcast, which contains a virtual machine application program that is to be executed. The method includes receiving a virtual machine application program signal, downloading a virtual machine application program, ahead-of-time (AOT) compiling virtual machine instruction code included in the downloaded virtual machine application program before executing the downloaded virtual machine application program, and executing the compiled virtual machine instruction code using a virtual machine.

13 Claims, 9 Drawing Sheets

METHOD OF EXECUTING VIRTUAL MACHINE APPLICATION PROGRAM AND DIGITAL BROADCAST RECEIVER USING THE SAME

CROSS-REFERENCE TO RELATED APPLICATION

This application claims priority from Korean Patent Application No. 10-2004-0077577 filed on Sep. 25, 2004 in the Korean Intellectual Property Office, the disclosure of which is incorporated herein by reference in its entirety.

BACKGROUND OF THE INVENTION

1. Field of the Invention

The present invention relates to a virtual machine, and more particularly, to a method of receiving a digital broadcast in which an ahead-of-time (AOT) compilation operation is performed before, instead of during, execution of a virtual machine application program downloaded from a network.

2. Description of the Related Art

A Java virtual machine provides a standard application execution environment that ensures the mobility of an application program. That is, Java programs are executable by any type of information device. FIG. 1 is a block diagram of a conventional digital broadcast receiver 100 equipped with a virtual machine. Referring to FIG. 1, the digital broadcast receiver 100 includes a central processing unit (CPU) 10, a memory 20, a multimedia system 30, a peripheral device module 40, and a bus 50. The CPU 10, the memory 20, the multimedia system 30, and the peripheral device module 40 are connected to one another via the bus 50.

The multimedia system 30 includes a tuner 31, a demultiplexer 32, a conditional access system 33, a Moving Picture Experts Group (MPEG) decoder 34, and other data processors, such as a graphic processor 35, a video processor 36, and an audio processor 37.

The peripheral device module 40 may include a universal serial bus (USB) connection device 41, a serial connection device 42, an infrared ray (IR) connection device 43, a flash memory 44, an Ethernet communication device 45, and a hard disk 46. Ethernet communication may be configured using a wired packet communication network, such as a local area network (LAN) or an asymmetric digital subscriber line (ADSL)/cable modem-based wide area network (WAN), a wireless LAN, a wireless or mobile communication network based on Code Division Multiplexing Access (CDMA)/Global System for Mobiles (GSM)/General Packet Radio Service (GPRS) technology, or a wired or wireless broadcast network, such as a terrestrial wave broadcast network, a cable broadcast network, or a satellite broadcast network. If the digital broadcast receiver 100 is connected to a LAN, an IEEE 1394 or ADSL network via an Ethernet interface, it can receive a satellite broadcast or a terrestrial wave broadcast. If the digital broadcast receiver 100 receives a cable broadcast via a cable modem, it can support bi-directional communication without the aid of an Ethernet interface because the cable modem supports bi-directional communication. The peripheral device module 40 may also include a Small Computer System Interface (SCSI) or an Enhanced Integrated Device Electronics Interface (EIDEI) hard disk to provide a personal video recording function.

A digital television (DTV) middleware program 22 and a virtual machine 23 reside in memory 20. The DTV middleware program 22 enables the virtual machine 23 to execute a virtual machine application program downloaded from outside the digital broadcast receiver 100 by controlling the multimedia system 30 and the peripheral device module 40. The virtual machine 23 loads the virtual machine application program 21 into memory 30 and then executes the virtual machine application program 21.

The virtual machine application program 21 may be transmitted to the digital broadcast receiver 100 from outside the digital broadcast receiver 100 via a network and may be stored in a non-volatile storage device, such as a hard disk or a flash memory. In the case of being transmitted as a terrestrial wave broadcast or a satellite broadcast, the virtual machine application program 21 may have an MPEG-2 format or a Digital Storage Media-Command and Control (DSM-CC) format.

In the case of being transmitted as a cable broadcast, the virtual machine application program 21 may be delivered through an out-of-band (OOB) channel according to the Open Cable Application Platform (OCAP) specification, in which case, the virtual machine application program 21 is carried by a stream other than an MPEG-2 broadcast stream.

Also, the application can be transmitted over the internet using the Transfer Control Protocol/Internet Protocol (TCP/IP). In the case of receiving a cable broadcast, the digital broadcast receiver 100 may be connected to the Internet via a cable modem. In the case of receiving a terrestrial wave broadcast or a satellite broadcast, the digital broadcast receiver 100 may be connected to the Internet via an IEEE 1394 or ADSL network.

The virtual machine application program 21 may be comprised of one or more class files. Each of the class files may include a plurality of methods containing execution code, and each of the methods may comprise an execution instruction represented in byte code.

Examples of the virtual machine 23 include the Java virtual machine, Common Language Runtime (CLR), which is a Microsoft virtual machine, and Smalltalk. However, for convenience of explanation, it is assumed that the virtual machine 23 is a Java virtual machine.

The class files constituting the virtual machine application program 23 are transmitted or stored in a specific file format. FIG. 2 is a diagram illustrating a typical format of a Java class file. Referring to FIG. 2, a class file includes various class attributes. The attributes include a class header, a constant pool that manages all of a plurality of constants used in the class, interface information regarding an interface of the class, field information regarding a plurality of fields of the class, and method information regarding a plurality of methods included the class. The method information stores as byte code a plurality of execution instructions respectively corresponding to the methods included in the class.

In the digital broadcast receiver 100, the operation of the DTV middleware program 22 and the operation of the virtual machine 23 are sequentially carried out. However, since, in the digital broadcast receiver 100, a compilation operation is performed during execution of the virtual machine application program 21, the digital broadcast receiver 100 may have the following disadvantages.

First, since a compilation operation is performed during execution of the virtual machine application program 21, the duration of the compilation operation may adversely affect the amount of time taken to execute the virtual machine application program 21. In addition, the compilation operation is carried out with the aid of an interpreter. Thus, the performance of the digital broadcast receiver 100 is poorer than the performance of a digital broadcast receiver that compiles a virtual machine application program into machine code and then executes the compiled virtual machine application program, and it generally takes the digital broadcast receiver 100 a long time to respond to a user.

Second, the digital broadcast receiver 100 performs a compilation operation whenever there is the need to execute a virtual machine application program. Thus, the digital broadcast receiver 100 may compile the same virtual machine application program over and over again instead of re-using the compilation.

Third, in the case of compiling a virtual machine application program stored in a permanent storage device without an automatic start option set therein, the digital broadcast receiver 100 must wait for a user to choose an icon corresponding to the virtual machine application program instead of readily executing the virtual machine application program, thus wasting system resources.

In order to solve the above problems with a conventional virtual machine performing a just-in-time (JIT) compilation operation, various methods have been suggested.

U.S. Pat. No. 6,412,108 discloses a method of optimizing the performance of a Java method in which Java byte code is compiled before Java classes are executed. In this method, a plurality of Java classes compiled into machine code in advance are directly executed without the aid of an interpreter, and thus, it is possible to reduce the amount of time required to execute a virtual machine application program by as much time as it takes an interpreter to interpret the Java classes. In this method, however, there is still a high possibility that a user will be adversely affected by the amount of time taken to perform the compilation operation because the compilation operation is performed after issuing a request for the execution of a class. In addition, in this method, even Java methods that are not often executed are compiled whenever a compilation operation is performed, thus increasing the time it takes a virtual machine to respond to a user.

U.S. Pat. No. 6,110,226 discloses an ahead-of-time (AOT) compilation method in which a plurality of classes are compiled in advance and the compilation results are stored in a storage device. In this AOT compilation method, the classes are compiled before a request for the execution of the classes is issued to a virtual machine. Thus, the compilation operation does not affect the amount of time required by a virtual machine to respond to a user. However, this AOT compilation method requires a device manufacturer to compile the classes in advance and store the results in the device, such as a digital broadcast receiver, when manufacturing the device. Therefore, this AOT compilation method may not be suitable for handling classes that are dynamically downloaded from their sources, such as digital broadcasts.

U.S. Pat. No. 6,295,638 discloses a method of loading native object code into a data processing system in which a virtual machine application program is JIT-compiled and the JIT compilation is stored as a file. This code loading method can solve the problems of conventional JIT compilation method by recycling the compilation. In other words, this code loading method prevents the same virtual machine application program from being compiled more than once, thus reducing the overall compilation time. However, it takes almost as much time to compile a new virtual machine application program in this code loading method as in the JIT compilation method. In addition, like the conventional JIT compilation method, this code loading method does not use system resources efficiently as a virtual machine waits for a user to input information thereto.

U.S. Pat. No. 5,970,249 discloses an optimized method where Java classes are compiled when a Java virtual machine is idle. This optimized method makes it possible to efficiently use system resources by compiling a plurality of methods that have not been compiled in an increasing order of their priority levels during idle time after executing the methods. In this method, a compilation operation is performed during idle time, thereby making it possible to more efficiently use system resources than in the conventional JIT compilation method. In this method, however, a compilation operation is performed after an execution request is issued, and thus, the time it takes a virtual machine to respond to a user increases by as much as the duration of the compilation operation. In addition, in this method, a plurality of methods included in a Java class must be interpreted in order to determine their priority levels, regardless of whether they are frequently executed, and thus, the amount of time required to execute the Java class undesirably increases.

SUMMARY OF THE INVENTION

The present invention provides a method of executing a virtual machine application program in which it is possible to reduce the amount of time required to compile a downloaded virtual machine application program and readily respond to a user by AOT-compiling the downloaded virtual machine application program and then executing the AOT-compiled virtual machine application program using machine code.

According to an aspect of the present invention, there is provided a method of executing a virtual machine application program including receiving a virtual machine application program signal, downloading a virtual machine application program from the received virtual machine application program signal, AOT-compiling virtual machine instruction code included in the downloaded virtual machine application program before executing the downloaded virtual machine application program, and executing the compiled virtual machine instruction code using a virtual machine.

According to another aspect of the present invention, there is provided a digital broadcast receiver that includes a virtual machine and a DTV middleware program operating together with the virtual machine, the digital broadcast receiver including a DTV middleware program which operates together with a virtual machine so that the virtual machine can operate in the digital broadcast receiver, a tuner which receives a virtual machine application program signal, a peripheral device module which downloads a virtual machine application program from the virtual machine application program signal received by the tuner in response to a request issued by the DTV middleware program, and the virtual machine which AOT-compiles virtual machine instruction code included in the downloaded virtual machine application program before executing the downloaded virtual machine application program and then executes the downloaded virtual machine application program.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
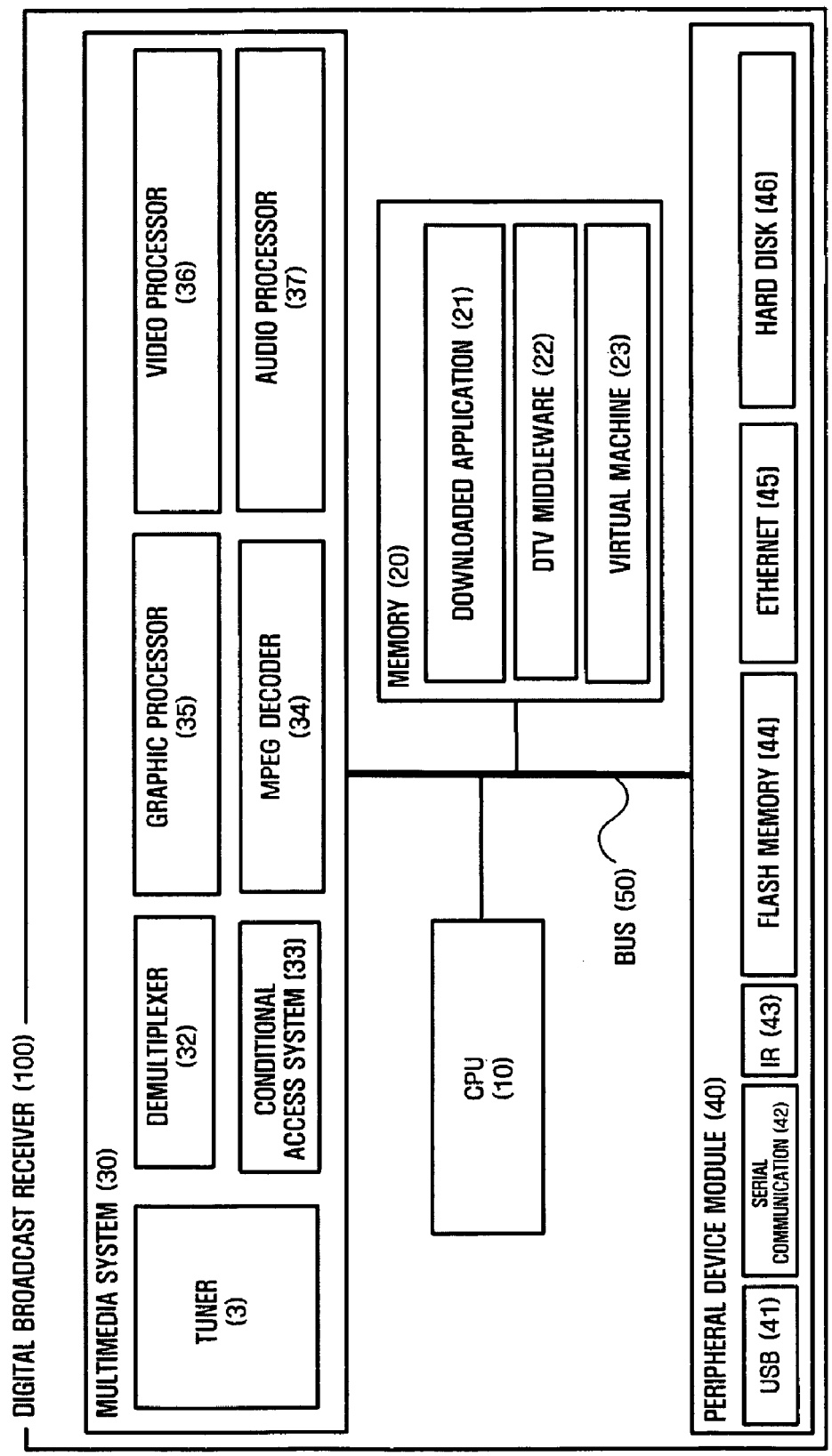
FIG. 1 is a block diagram of a conventional digital broadcast receiver in which a virtual machine is installed.
Figure 2:
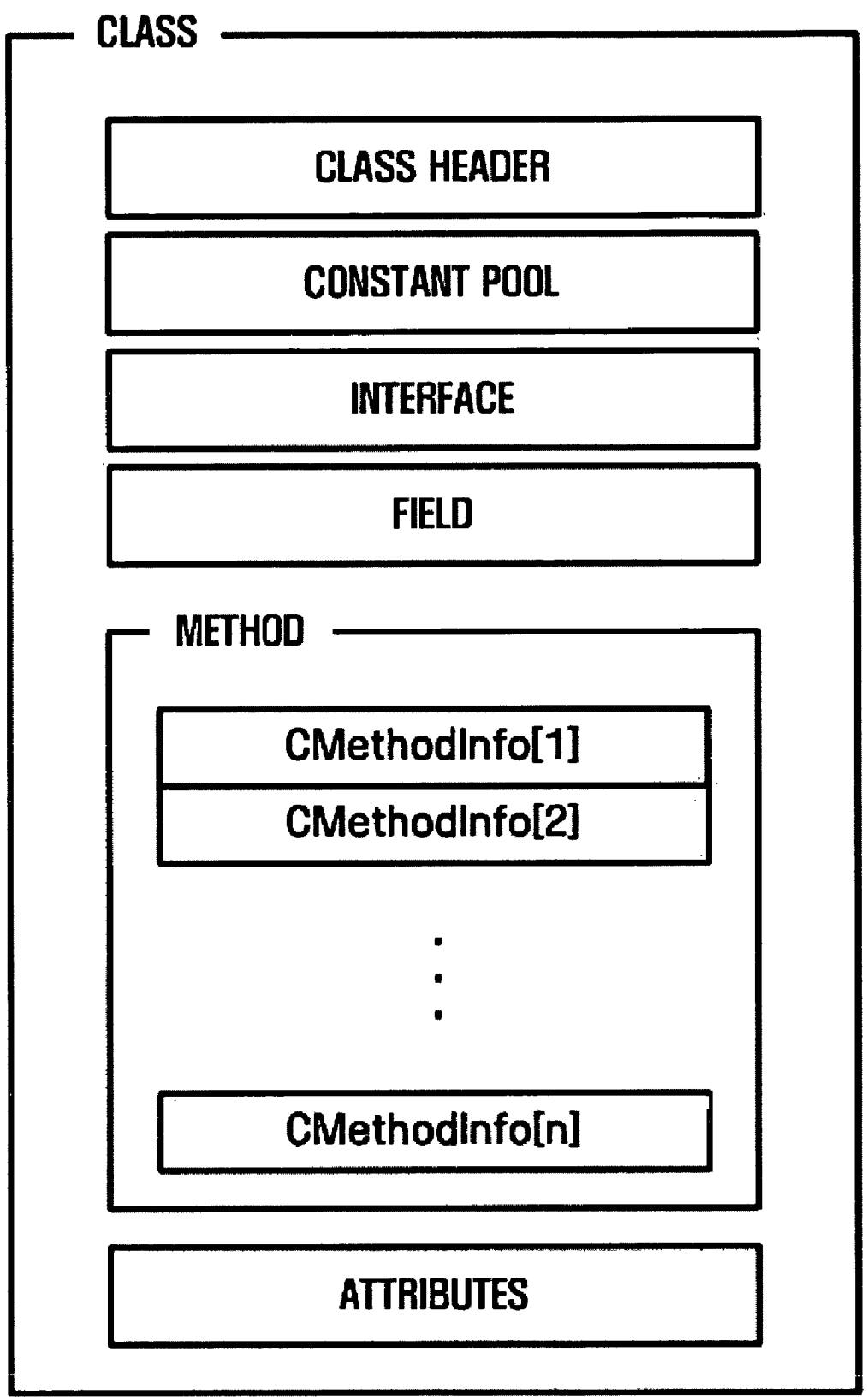
FIG. 2 is a diagram illustrating the format of a typical Java class file.

The present invention will now be described more fully with reference to the accompanying drawings, in which exemplary embodiments of the invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

A virtual machine according to an exemplary embodiment of the present invention includes various elements and operates on a memory in the same manner as the virtual machine 23 of FIG. 1.

Figure 3:
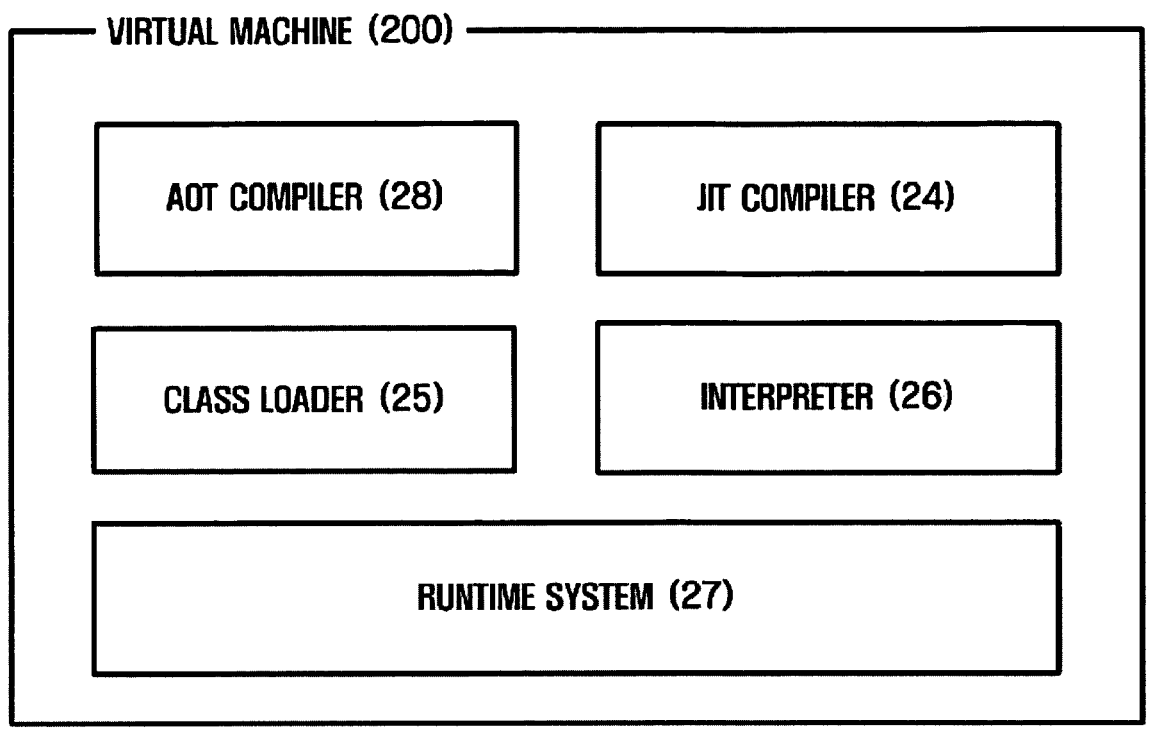
FIG. 3 is a block diagram of a virtual machine 200.

FIG. 3 illustrates the detailed structure of the virtual machine 23 of FIG. 1 (virtual machine 200).

Referring to FIG. 3, the virtual machine 200 includes a JIT compiler 24, an interpreter 26, a class loader 25, which loads a class into, for example, the memory 20 of FIG. 1, and a runtime system 27, which manages the operation of runtime resources. The virtual machine 200 also includes an AOT compiler 28.

The interpreter 26, which is an essential part of the digital broadcast receiver 100 for executing class code, recognizes and executes virtual machine instruction code. Virtual machine instruction code is code that causes a corresponding instruction to be executed when interpreted by the virtual machine 200. Virtual machine instruction code is different from machine code, which is executable when recognized by, for example, the CPU 10 of FIG. 1. If the virtual machine 200 is a Java virtual machine, the virtual machine instruction code may be called byte code.

The JIT compiler 24 converts virtual machine instruction code into machine code that can be recognized by the CPU 10 of FIG. 1 when executing a class. The AOT compiler 28 compiles virtual machine instruction code before executing a class or an application program and then converts the compiled virtual machine instruction code into machine code that can be recognized by the CPU 10 of FIG. 1.

The AOT compiler 28 is an essential part of the virtual machine 200 for compiling a plurality of methods. When compiling the methods, it is preferable to use both the AOT compiler 28 and the JIT compiler 24 because the JIT compiler 24 can compile some of the methods that are left uncompiled by the AOT compiler 28.

The virtual machine 200 is an exemplary software program and thus may have a different structure from the structure illustrated in FIG. 3. For example, a module that uses both the AOT compiler 28 and the JIT compiler 24, such as a machine code generation module, may be designed to be shared by the AOT compiler 28 and the JIT compiler 24. In short, various changes in form and details may be made in the present invention without departing from the spirit and scope of the present invention.

Figure 4:
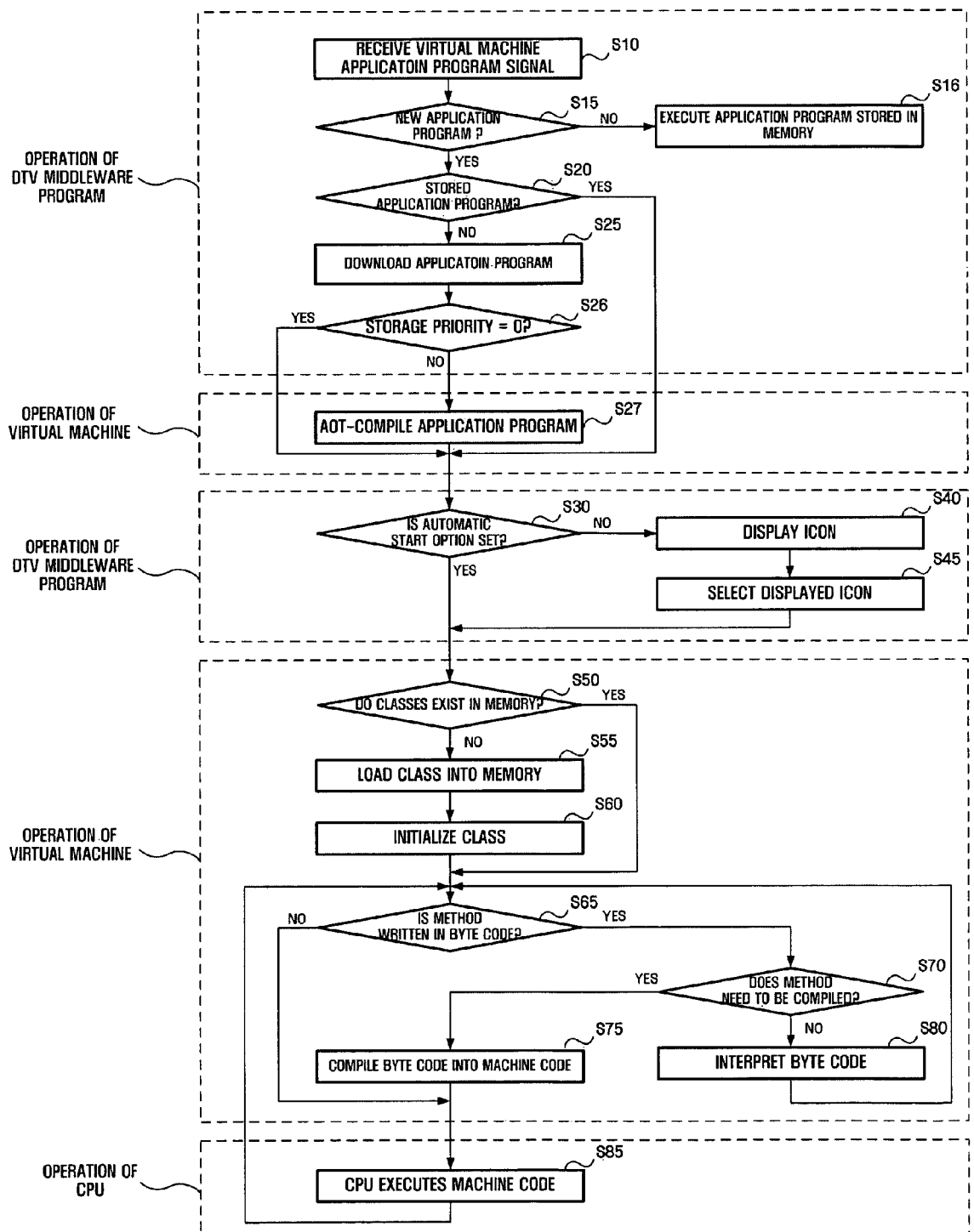
FIG. 4 is a flowchart illustrating a method of executing a virtual machine application program according to an exemplary embodiment of the present invention.

The virtual machine 200 and a DTV middleware program 300 operate together in an approach illustrated in FIG. 4. FIG. 4 is a flowchart illustrating a method of executing a virtual machine application program according to an exemplary embodiment of the present invention, which includes obtaining a virtual machine application program signal related to a predetermined virtual machine application program from a digital broadcast signal, downloading the predetermined virtual machine application program, and executing the downloaded virtual machine application program.

Referring to FIG. 4, the method is divided into processes performed by the DTV middleware program 300, and processes performed by the virtual machine 200. For convenience of explanation, it is assumed that a digital broadcast receiver equipped with the virtual machine 200 follows a set of cable broadcast standards and the DTV middleware program 300 satisfies the Open Cable Applications Platform (OCAP) specifications.

In detail, operations S10 through S26 are performed by the DTV middleware program 300. The DTV middleware program 300, like the DTV middleware program 22 of FIG. 1, may operate on the memory 20 of FIG. 1.

In operation S10, the DTV middleware program 300 receives a virtual machine application program signal contained in a digital broadcast signal. In operation S15, the DTV middleware program 300 determines whether a virtual machine application program contained in the received virtual machine application program signal is new. Here, a new virtual machine application program means a virtual machine application program not being currently executed for a current service. If the virtual machine application program is not new, it may still exist in the memory 20 of FIG. 1, on which the DTV middleware program 300 operates, and thus, the virtual machine application program can be readily executed in operation S16.

If the virtual machine application program is determined to be new in operation S15, in operation S20 the DTV middleware program 300 determines whether it is stored in memory 20 or another permanent storage device. If the virtual machine application program is determined to be stored in memory 20 or another permanent storage device, the method skips operation S27 and proceeds to operation S30.

If the virtual machine application program is determined not to be stored in memory 20 or another permanent storage device in operation S20, in operation S25 it is downloaded with reference to an extended application information table (XAIT).

In operation S26, it is determined whether a storage priority field included in the virtual machine application program has a value of 0. If a storage option is set in the received virtual machine application program signal, the storage priority field has a value other than 0. Otherwise, the storage priority field has a value of 0.

If the storage priority field has a value of 0 in operation S26, the virtual machine application program is an application program that does not need to be stored, and thus, the method proceeds to operation S30. Otherwise, the DTV middleware program 300 calls the virtual machine 200 and controls the virtual machine 200 to perform an AOT compilation operation using the AOT compiler 28 in operation S27 because a virtual machine application program whose storage priority field has a value other than 0 is an application program that can be executed again later, and thus, needs to be stored in a non-volatile memory or another storage device. The storage priority field of the virtual machine application program may be set to a value of 0 to indicate that the virtual machine application program is stored in a storage device, or it may be set to a value other than 0 to indicate that the virtual machine application program is an application program that does not need to be stored.

The DTV middleware program 200 fetches information regarding a beginning class file of the virtual machine application program from the XAIT and provides the fetched information to the virtual machine 200 so that the virtual machine 200 can perform an AOT compilation operation using this information in operation S27. Operation S27 will be described later in further detail with reference to FIG. 5.

Referring to FIG. 4, operations S30, S40 and S45 are performed by the DTV middleware program 200 after the virtual machine 200 performs an AOT compilation operation in operation S27.

In operation S30, the DTV middleware program 200 determines whether an "automatic start option" is set in the received virtual machine application program signal. Here, the automatic start option ensures that the virtual machine application program is automatically executed immediately after being downloaded. In operation S30, if the automatic start option is set in the received virtual machine application program signal, the method proceeds to operation S50. Otherwise, an icon for selecting the virtual machine application program is displayed on a screen in operation S40. If a user selects this icon in operation S45, the method proceeds to operation S50.

Operations S50 through S80 are performed by the virtual machine 200. In operation S50, the virtual machine 200 determine whether a class of the virtual machine application program exists in memory 20, i.e., whether the class of the virtual machine application program has been loaded into memory 20. If the class of the virtual machine application program has not been loaded into the memory 20, it is loaded into memory 20 in operation S55. In operation S60, if the loading of the class of the virtual machine application program is complete, the loaded class of the virtual machine application program is initialized for execution.

In the present exemplary embodiment, if there is a class of the virtual machine application program already loaded into memory 20 as a result of the compilation operation performed in operation S27, operations S50 and S55 are skipped, thereby reducing the time it takes to respond to a user in an overall process of executing the virtual machine application program.

If the class of the virtual machine application program is loaded into memory 20 and initialized, the execution of the virtual machine application program begins with a main method of the loaded class. In operation S65, it is determined whether each of a plurality of methods included in the loaded class is written in virtual machine instruction code. If none of the methods included in the loaded class are determined to be written in virtual machine instruction code in operation S65, in operation S85 they are assumed to be written in machine code and are executed by the CPU 10 of FIG. 1.

If the class of the virtual machine application program is already compiled (operation S27 illustrated in FIG. 5), a plurality of methods contained in the class of the virtual machine application program are already written in machine code. Thus, the methods included in the class of the virtual machine application program do not need to be compiled but are readily executed by the CPU 10. Accordingly, it is possible to considerably improve the speed of responding to a user in the overall process of executing the virtual machine application program.

In operation S70, if the methods included in the loaded class are written in virtual machine instruction code, it is determined whether to compile the methods included in the loaded class. If the methods included in the loaded class are determined not to be compiled in operation S70, in operation S80 the virtual machine instruction code is interpreted using the interpreter 26 of the virtual machine 200, and a plurality of execution instructions corresponding to the methods included in the loaded class are executed. In operation S70, it is determined whether to compile the methods included in the loaded class based on whether the number of times the methods included in the loaded class have been executed; if the number exceeds a predetermined critical value, the methods are compiled. If it is determined that the methods included in the loaded class must compiled in operation S70, in operation S75 they are compiled into the machine code. In operation S85, the compilation produced in operation S75 is executed by the CPU 10.

The terms "virtual machine" and "DTV middleware" or each component thereof, as used herein, is hereinafter referred to as a "module". A module refers to, but is not limited to, a software or hardware component, such as a Field Programmable Gate Array (FPGA) or an Application Specific Integrated Circuit (ASIC), which performs certain tasks. A module may advantageously be configured to reside on the addressable storage medium and execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed one or more computers in a communication system.

Figure 5:
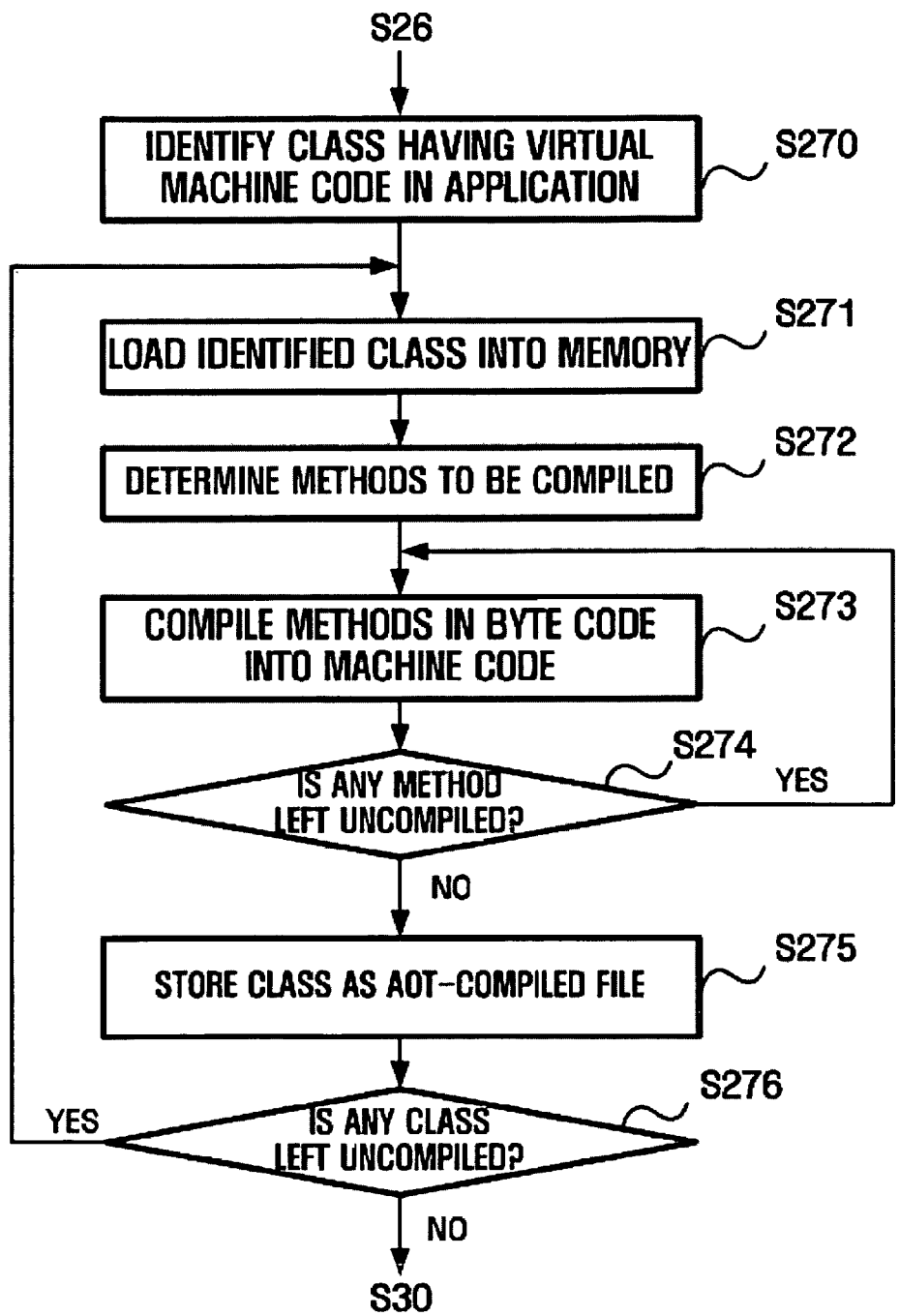
FIG. 5 is a detailed flowchart illustrating operation S27 of FIG. 4.

FIG. 5 is a detailed flowchart illustrating operation S27 of FIG. 4. Referring to FIG. 5, in operation S270, the virtual machine 200 identifies a class file including virtual machine code that exists in a virtual machine application program. In operation S271, the virtual machine 200 loads the identified class file into memory allotted thereto (e.g., the memory 20 of FIG. 1) by using, for example, the class loader 25. In operation S272, the virtual machine 200 determines which methods included in the loaded class file (stored in a library or downloaded when necessary) need to be compiled. In operation S273, the virtual machine 200 compiles into machine code the methods that are determined in operation S272 to need compilation. In operation S274, it is determined whether all of the methods included in the loaded class file are compiled. If not all of the methods included in the loaded class file are compiled, the method returns to operation S273. However, if none of the methods included in the loaded class file are left uncompiled in operation S274, the AOT compiled code is stored in class files in operation S275.

Figure 6:
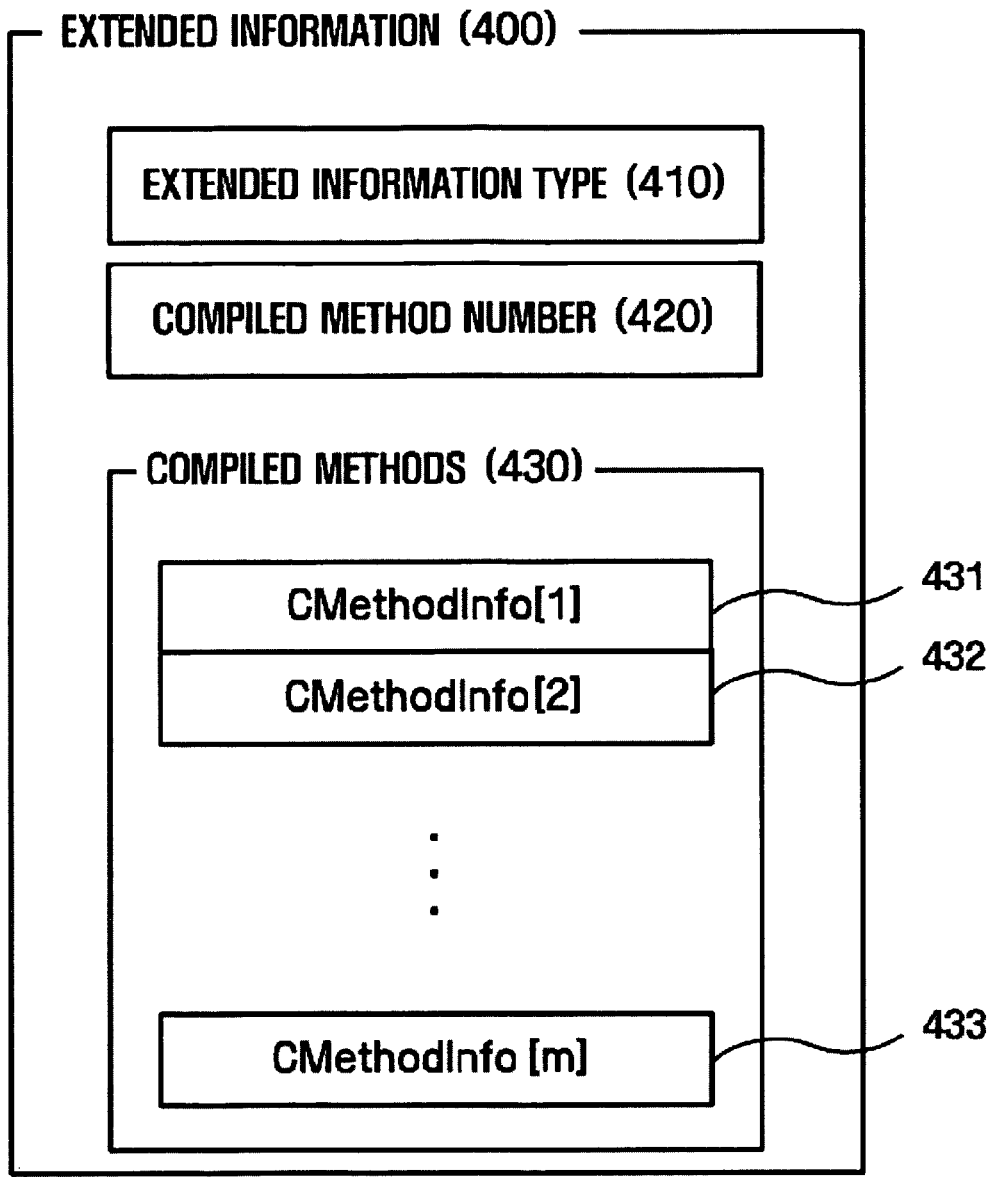
FIG. 6 is a diagram illustrating the format of extended information attached to the tail of a class file in an AOT compilation.

FIG. 6 illustrates the format of extended information 400, which is used to generate a class file including compiled machine code, and is then attached to the tail of the generated class file. The extended information 400 includes an type field 410 specifying the type of the extended information 400, a compiled method number field 420 specifying the number of compiled methods included in a class file to which the extended information 400 is attached, and compilation information 430 including complication information CMethodInfo[1] 431 through CMethodInfo[m] 433 regarding each of the compiled methods included in the class file. CMethodInfo[1] 431 through CMethodInfo[m] 433 have the format illustrated in FIG. 7.

Figure 7:
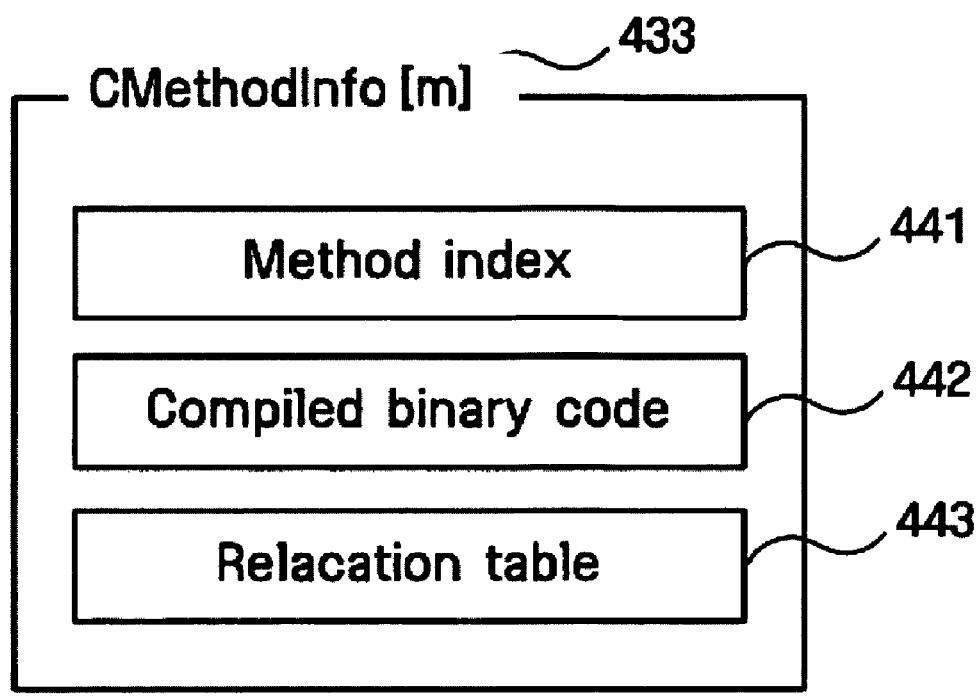
FIG. 7 is a diagram illustrating the format of compilation information CMethodInfo.

Referring to FIG. 7, the m-th compilation information CMethodInfo[m] 433, for example, includes a method index field 441 in which an index value designating an m-th compiled method is recorded, a compiled binary code field 442 in which a binary value of code into which the m-th compiled method is compiled is stored, and a relocation table field 443 in which a relocation table is stored. The index value recorded in the method index field 441 is an index value of a constant pool. Here, the constant pool is used to designate each compiled method included in a class file when all of a plurality of methods included in the class file are not be compiled. The relocation table is used to modify a direct address, which is used in the compiled binary code field 442 to load the code into virtual memory, according to an actual memory address.

Referring back to FIG. 5, in operation S276, it is determined whether any of the class files of the virtual machine application program are left uncompiled. In operation S276, if there is a class file of the virtual machine application program left uncompiled in operation S276, the method returns to operation S271, and operations S271 through S276 are repeated until none of the class files of the virtual machine application program are left uncompiled. The virtual machine 200 may obtain information regarding which of the class files of the virtual machine application program need to be compiled at the stage of compiling the beginning class file of the virtual machine application program. For example, if a method in one class file calls a method in another class file, both of the class files need to be compiled. If the compilation of all of the class files of the virtual machine application program is complete, the entire AOT compilation operation performed in operation S27 is complete.

The present invention provides a method of reducing the amount of time required to perform an AOT compilation operation as well as a method of performing an AOT compilation operation on a virtual machine application program downloaded in real time. This method is used to reduce the amount of time required to analyze a considerable number of class files of a virtual machine application program by allowing a broadcast transmitter to transmit information regarding each of the class files together with the virtual machine application program.

Figure 8:
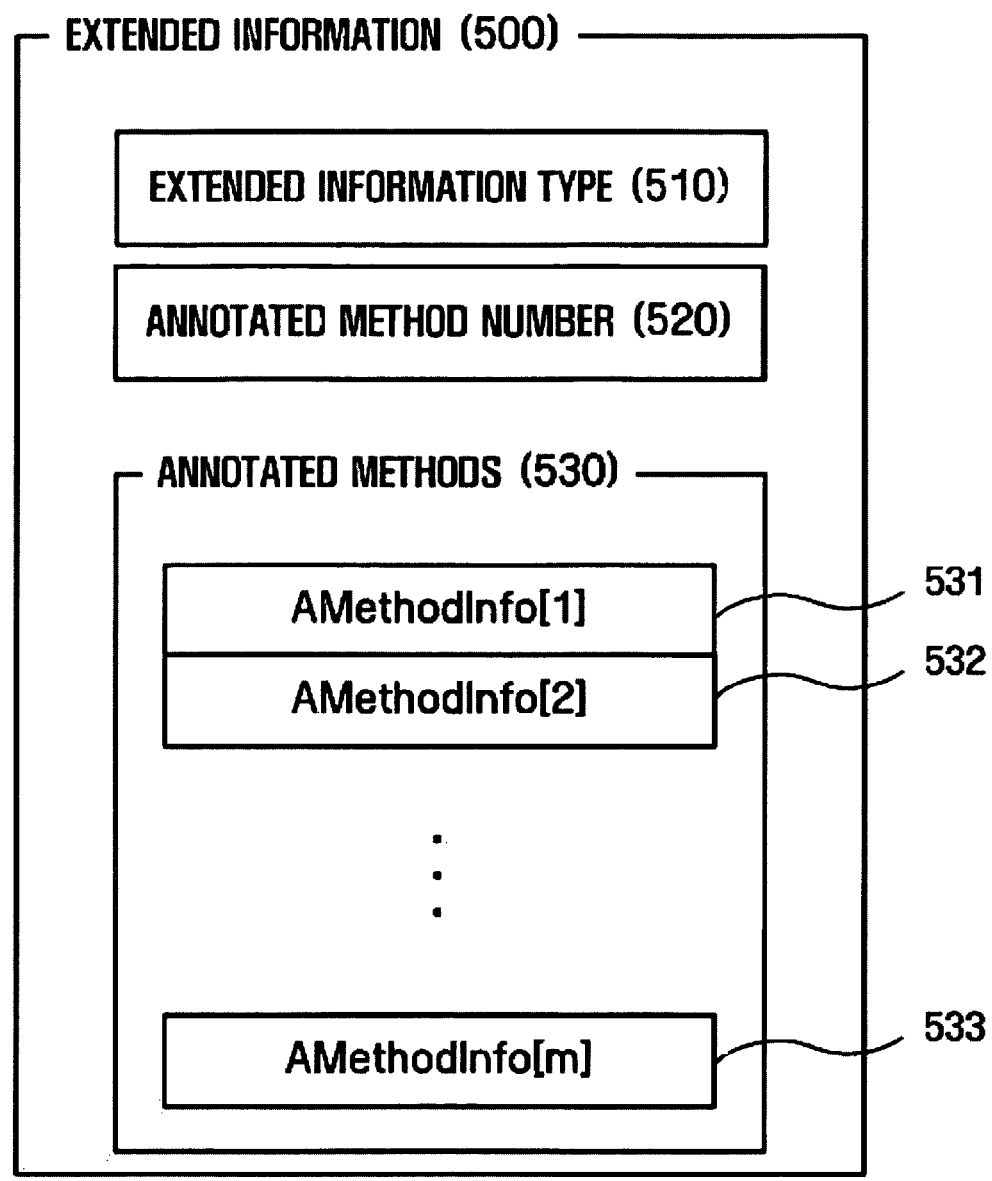
FIG. 8 is a diagram illustrating the format of extension information attached to the tail of a class file transmitted by a broadcast receiver.

FIG. 8 is a diagram illustrating the format of extended information 500, which is attached to the tail of a class file including compilation information. Referring to FIG. 8, the extended information 500 includes a type field 510 specifying the type of the extended information 500, an annotated method number field 520 specifying the number of annotated methods included in a class file to which the extended information 500 is attached, and annotated method information 530 which includes annotated method information AMethodInfo[1] 531 through AMethodInfo[m] 533 regarding each of the annotated methods included in the class file. Here, the annotated methods indicate the methods included in the class file that have been analyzed.

Figure 9:
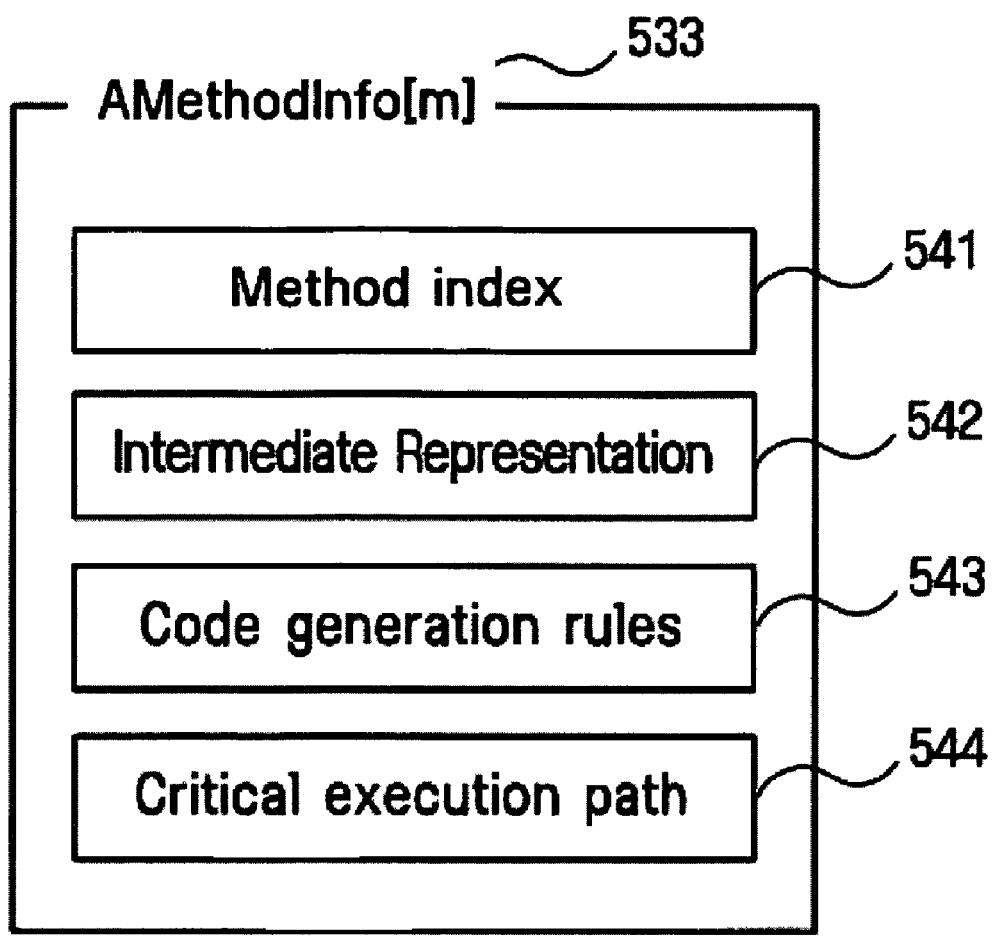
FIG. 9 is a diagram illustrating the format of information AMethodInfo.

Referring to FIG. 9, the m-th information AMethodInfo[m] 533 includes a method index field 541 in which an index value designating an m-th annotated method of the class file is recorded, an intermediate representation field 542 in which an intermediate representation used to designate the m-th annotated method in the middle of compiling the m-th annotated method is recorded, a code generation rule field 543 in which a set of code generation rules necessary to generate machine code are recorded, and a critical execution path field 544, in which execution path information regarding code executed frequently by methods in other classes is recorded.

The m-th annotated method may be designated using different intermediate representations depending on how the m-th annotated method has been compiled. Examples of the intermediate representation used to designate the m-th annotated method include a call flow graph which specifies the relationships among a plurality of basic blocks which are code blocks classified based on a branch instruction, and an abstract syntax tree which illustrates what virtual machine code looks like after being parsed.

Accordingly, in the present invention, if extended information is attached to the tail of a loaded class file, the analysis of a plurality of methods included in the loaded class file with reference to the extended information is skipped, and the compilation of the methods included in the loaded class file is simply done by generating machine code using intermediate representations generated in advance. Therefore, it is possible to considerably reduce the amount of time required to compile the methods included in the loaded class file.

In the present invention, an AOT compilation operation is performed by a virtual machine before a virtual machine application program is executed. However, in the prior art, a DTV middleware program and the virtual machine are sequentially executed. Accordingly, the present invention provides the following advantages.

First, in the present invention, a compilation operation is performed before a virtual machine application program is executed, and thus, the amount of time for executing the virtual machine application program is not affected by the amount of time for performing the compilation operation. In addition, in the present invention, the virtual machine application program is directly compiled into machine code, but, in the prior art, the virtual machine application program is interpreted with the aid of an interpreter and then compiled. Thus, the compilation operation in the present invention is more efficient than the compilation operation in the prior art, and the time it takes a virtual machine to respond to a user is considerably reduced in comparison.

Second, in the present invention, in a case where the same virtual machine application program is executed more than once, it is compiled not every time it is executed but once because the compilation result is stored in a class file. Thus, the compilation result stored in the class file can be used afterwards.

Third, in the present invention, in the case of a virtual machine application program stored in a storage device with no automatic start option set therein, a compilation operation is performed before a user selects an icon corresponding to the virtual machine application program, which is output by a DTV middleware program. Thus, it is possible to prevent waste of CPU resources even when the DTV middleware program waits for a user to select the icon corresponding to the virtual machine application program while performing a compilation operation.

Fourth, in the present invention, information necessary to perform a compilation operation is stored in a class file. As such, it is possible to considerably reduce the amount of time required to perform the compilation operation by referencing the information stored in the class file, and thus, it is possible to improve the performance of the DTV middleware program and the virtual machine.

Although the present invention has been described with reference to exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. A method of executing a virtual machine application program, the method comprising:
   receiving a virtual machine application program signal;
   determining whether a virtual machine application program related to the virtual machine application program signal is new and is not stored in a storage device;
   in response to determining that the virtual machine application program is new and is not stored in the storage device, downloading the virtual machine application program related to the signal and then determining whether the downloaded virtual machine application program indicates that the downloaded virtual machine application program needs to be stored in the storage device;
   in response to determining that the downloaded virtual machine application program indicates that the downloaded virtual machine application program needs to be stored in the storage device, ahead-of-time (AOT)-compiling virtual machine instruction code included in the downloaded virtual machine application program before executing the downloaded virtual machine application program; and
   executing the compiled virtual machine instruction code using a virtual machine.

2. The method of claim 1, wherein the AOT-compiling comprises:
   identifying a class file including the compiled virtual machine instruction code;
   loading the identified class file into a memory;
   determining which of a plurality of methods included in the loaded class file are to be compiled;
   compiling the loaded class file by compiling virtual machine instruction codes included in the methods which are determined to be compiled; and
   storing the compiled class file as an AOT compiled class file.

3. The method of claim 2, wherein the identifying comprises identifying the class file with reference to execution path information regarding the methods which are determined to be compiled, and the execution path information is attached to the class file.

4. The method of claim 2, wherein the determining comprises determining which of the methods included in the loaded class file are to be compiled with reference to information regarding the methods which are determined to be compiled, and the information is attached to the loaded class file.

5. The method of claim 2, wherein the compiling comprises compiling the loaded class file using intermediate representations stored in the loaded class file.

6. The method of claim 2, wherein the storing comprises attaching to a tail of the loaded class file method indexes designating the compiled methods of the loaded class file, machine code containing the compiled methods of the loaded class file, and a relocation table used to convert the machine code to be compatible with the memory when loading the compiled methods into the memory.

7. The method of claim 1, wherein the virtual machine is a Java virtual machine, and the virtual machine instruction code is byte code.

8. The method of claim 1, wherein, if an automatic start option is set in the virtual machine application program signal, execution is performed immediately after the compiling is complete.

9. The method of claim 1 further comprising displaying an icon corresponding to the virtual machine application program signal on a screen between the compiling and the executing if an automatic start option is not set in the virtual machine application program signal.

10. The method of claim 1, wherein the compiling is performed only if a storage option is set in the virtual machine application program signal.

11. A digital broadcast receiver comprising:
    a virtual machine;
    a tuner which receives a virtual machine application program signal; and
    a digital television (DTV) middleware program which operates together with the virtual machine;
    a peripheral device module which downloads a virtual machine application program related to the virtual machine application program signal in response to a request issued by the DTV middleware program in response to a determination by the DTV middleware program that the virtual machine application program is new and is not stored in a storage device,
    wherein after the peripheral device module downloads the virtual machine application program, the DTV middleware program determines whether the downloaded virtual machine application program indicates that the virtual machine application program needs to be stored in the storage device, and
    wherein in response to a determination by the DTV middleware program that the downloaded virtual machine application program indicates that the virtual machine application program needs to be stored in the storage device, the virtual machine ahead-of-time (AOT)-compiles virtual machine instruction code included in the downloaded virtual machine application program before executing the downloaded virtual machine application program and then executes the downloaded virtual machine application program.

12. The digital broadcast receiver of claim 11, wherein the virtual machine loads a class file including the virtual machine instruction code into a memory, determines which of a plurality of methods included in the loaded class file are to be compiled, compiles the loaded class file by compiling virtual machine instruction codes included in the methods that are determined to be compiled, and stores the compiled class file as an AOT compiled class file.

13. The digital broadcast receiver of claim 11, wherein the virtual machine is a Java virtual machine, and the virtual machine instruction code is byte code.

* * * * *